United States Patent
Schencke et al.

(10) Patent No.: US 10,601,271 B2
(45) Date of Patent: Mar. 24, 2020

(54) DYNAMOELECTRIC MACHINE INCLUDING DISPLACEABLE FLUX-GUIDING ELEMENTS

(71) Applicant: Schaeffler Technologies AG & Co. KG, Herzogenaurach (DE)

(72) Inventors: Thomas Schencke, Langewiesen (DE); Juergen Weyh, Viernau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 520 days.

(21) Appl. No.: 15/323,146

(22) PCT Filed: Apr. 16, 2015

(86) PCT No.: PCT/DE2015/200263
§ 371 (c)(1),
(2) Date: Dec. 30, 2016

(87) PCT Pub. No.: WO2016/000698
PCT Pub. Date: Jan. 7, 2016

(65) Prior Publication Data
US 2017/0163109 A1    Jun. 8, 2017

(30) Foreign Application Priority Data
Jul. 3, 2014   (DE) .................. 10 2014 212 869

(51) Int. Cl.
*H02K 1/28*      (2006.01)
*H02K 1/27*      (2006.01)
*H02K 21/02*     (2006.01)

(52) U.S. Cl.
CPC ............. *H02K 1/28* (2013.01); *H02K 1/2773* (2013.01); *H02K 21/028* (2013.01)

(58) Field of Classification Search
CPC .......................... H02K 1/2773; H02K 21/028
(Continued)

(56) References Cited

U.S. PATENT DOCUMENTS 7,385,332 B2    6/2008  Himmelmann et al.
8,198,774 B2 *  6/2012  Takashima ........... H02K 21/028
                                                     310/156.43
(Continued)

FOREIGN PATENT DOCUMENTS

CN    101783536 A    7/2010
CN    101783536 A    7/2010
(Continued)

*Primary Examiner* — Gary A Nash
(74) *Attorney, Agent, or Firm* — Davidson, Davidson & Kappel, LLC

(57) ABSTRACT

A dynamoelectric machine having mechanical field weakening is provided. A design that is advantageous in terms of efficiency is brought about by a machine having a stator (1), a rotor (2) that is spaced from the stator (1) by an air gap (8), permanent magnets (4) for generating an exciter field in the air gap (8), which permanent magnets are arranged in magnet pockets (3) on the rotor (2), and displaceable flux-guiding elements (10) guided in radially extending grooves (12), wherein the density of the exciter field in the air gap (8) can be influenced by the radial position of the flux-guiding elements, and wherein the leakage flux-guiding elements (10) are arranged underneath the permanent magnets (4) when viewed in a radial direction.

14 Claims, 2 Drawing Sheets

(58) Field of Classification Search
USPC .......................... 310/156.01, 156.07, 156.17
See application file for complete search history.

(56) References Cited

U.S. PATENT DOCUMENTS

| | | | |
|---|---|---|---|
| 2006/0091752 A1* | 5/2006 | Adaniya | F04B 27/0895 |
| | | | 310/156.16 |
| 2006/0284580 A1* | 12/2006 | Kitamura | H02K 11/048 |
| | | | 318/268 |
| 2007/0241628 A1 | 10/2007 | Himmelmann et al. | |
| 2010/0026125 A1* | 2/2010 | Hirabayashi | H02K 1/185 |
| | | | 310/156.16 |
| 2010/0259208 A1* | 10/2010 | Hao | H02K 21/028 |
| | | | 318/538 |
| 2012/0112591 A1* | 5/2012 | Feuerrohr | H02K 1/2773 |
| | | | 310/156.15 |
| 2013/0038161 A1* | 2/2013 | Pan | H02K 1/2773 |
| | | | 310/156.01 |
| 2013/0119811 A1* | 5/2013 | Kobayashi | H02K 1/02 |
| | | | 310/156.53 |
| 2013/0154436 A1* | 6/2013 | Nakano | H02K 1/148 |
| | | | 310/216.094 |
| 2013/0162096 A1* | 6/2013 | Shimizu | H02K 21/028 |
| | | | 310/209 |
| 2013/0207507 A1 | 8/2013 | Han et al. | |

FOREIGN PATENT DOCUMENTS

| | | |
|---|---|---|
| CN | 103248152 A | 8/2013 |
| DE | 102012201347 | 8/2013 |
| JP | H0993846 | 4/1997 |
| JP | 2004242462 | 8/2004 |
| JP | 2004242462 A | 8/2004 |

\* cited by examiner

1

DYNAMOELECTRIC MACHINE INCLUDING DISPLACEABLE FLUX-GUIDING ELEMENTS

The present invention relates to a permanently excited dynamoelectric machine which may be operated in the field weakening range.

BACKGROUND

The so-called permanently excited synchronous machine is an example of such an electric machine. Permanently excited synchronous machines are used in numerous applications in which electric drive tasks are to be carried out. In industrial applications, for example for machine tools or production machines, they are used as highly dynamic servomotors. Due to their high power density compared to other types of machines, they are also preferably used in the area of electromobility, in which the available installation space often represents a limiting variable. However, the permanently excited synchronous machine is also frequently used as a generator, for example in the field of regenerative energies, in particular wind power.

In comparison to electrically excited synchronous machines, the permanently excited synchronous machine is characterized by an increased efficiency. Ohmic losses are saved due to the fact that the permanently excited synchronous machine may dispense with electrical excitation. The excitation field of the machine is generally generated by permanent magnets situated in the rotor of the machine. A slip ring contact, which is necessary in electrically excited synchronous machines in order to supply current to an excitation coil situated on the rotor, may be dispensed with in the permanently excited synchronous machine. As a result, the maintenance effort for the permanently excited machine is also reduced compared to the electrically excited machine.

However, one disadvantage of permanent-magnet excitation is that the excitation field is not easily modifiable. In principle, a synchronous machine may be operated beyond its nominal speed by controlling the so-called field weakening range. In this range, the machine is operated at the maximum nominal power, the torque delivered by the machine being reduced with increasing rotational speed. Electrically excited synchronous machines may be operated very easily in the field weakening range by reducing the excitation current.

Options are known, also for permanently excited machines, for generating, via suitable energization of the stator of the machine, an air gap field component which counteracts the excitation field generated by the permanent magnets and thus weakens the excitation field. However, such control of the machine results in increased losses, so that the machine can be operated only at a reduced efficiency in this range.

To be able to operate permanently excited dynamoelectric machines in the field weakening range without appreciably impairing the efficiency of the machine, methods for mechanical field weakening are known from the prior art. Thus, CN 101783536 A describes a permanently excited synchronous motor with buried permanent magnets that are magnetized in the tangential direction, and which are adjoined in each case by a short circuit block that is radially displaceable, viewed radially outwardly. This short circuit block is pretensioned via a spring in such a way that the former is situated in a magnetically insulating area of the rotor at a low rotor rotational speed. With increasing rotational speed, the short circuit block is pressed outwardly against the spring tension, at which location it forms a short circuit path for the magnetic flux. The magnetic leakage flux conducted over this short circuit path reduces the effective air gap flux of the machine, so that the field weakening operation is controlled.

SUMMARY OF THE INVENTION

It is an object of the present invention to allow mechanical field weakening which is improved over the previously known prior art.

The present invention provides a dynamoelectric permanently excited machine.

The dynamoelectric machine includes a stator and a rotor spaced apart from the stator via an air gap. For generating an excitation field in the air gap of the machine, permanent magnets are situated in magnet pockets of the rotor. To be able to mechanically bring about field weakening, the machine also includes displaceable flux-guiding elements which are guided in radially extending grooves. The density of the excitation field in the air gap is influenceable via the radial position of these leakage flux-guiding elements.

The finding underlying the present invention is that the use of expensive magnet material may be significantly reduced by situating the leakage flux-guiding elements beneath the permanent magnets, viewed in the radial direction. The permanent magnets are thus situated closer to the air gap of the machine, so that the magnetic field generated by the permanent magnets experiences a lower magnetic resistance in the iron of the rotor. A spacing of the permanent magnets from the air gap, as provided in CN101783536 A, to provide room for movable leakage flux-guiding elements is avoided in the arrangement according to the present invention.

The permanent magnets are thus advantageously magnetized essentially tangentially with respect to the circumferential direction of the rotor. In other words, the magnetization direction of the permanent magnets is orthogonal with respect to the radial direction and the axial axis of symmetry of the rotor.

In one particularly advantageous embodiment of the present invention, the rotor is characterized in that a radially outwardly directed displacement of the leakage flux-guiding elements effectuates a reduction in the density of the excitation flux. In this way, use may be made of the centrifugal force, which increases with increasing rotor rotational speed, in order to control the field weakening operation. In order to have the complete flux which is generated by the permanent magnets available at low rotor rotational speed, the leakage flux-guiding elements may be inwardly pretensioned in the radial direction by a spring, for example. Due to the centrifugal force, which increases with increasing rotor rotational speed, the leakage flux-guiding elements are accelerated outwardly against the spring tension, and thus increase the leakage flux of the machine.

In another advantageous embodiment of the present invention, the dynamoelectric permanently excited machine also includes a signal input for an error signal, and an actuator for actively displacing the leakage flux-guiding elements radially outwardly. If an error is now recognized in an electrically operated vehicle, for example, with the aid of the actuator the complete excitation flow may be short-circuited via the leakage flux-guiding elements, independently of the machine speed.

Another advantageous embodiment of the machine is characterized in that the grooves are situated in a first material having a first permeability, and the magnet pockets are situated in a second material having a second permeability which is greater than the first permeability, the grooves being situated in radial alignment with the magnet pockets, so that the leakage flux-guiding elements are at least partially displaceable from a groove into a magnet pocket. As long as the leakage flux-guiding elements are situated in the area of the first material having the lower permeability, they do not represent a significant leakage flux path for the flux generated by the permanent magnets. For initiating the field weakening range, the leakage flux-guiding elements in each case are displaced from a groove into a magnet pocket, so that they become increasingly closer to the second material having the higher permeability. The more deeply the leakage flux-guiding elements penetrate into the magnet pocket, the more high-permeable rotor material is available for the leakage flux.

In another advantageous embodiment of the present invention, a type of spoke design for the rotor may be created in that the rotor includes a central, essentially cylindrical base body made of the first material in which the grooves are formed, and multiple flux-guiding elements made of the second material are situated in a partially ring-shaped cross section on a lateral surface of the base body to form a complete ring, in each case two flux-guiding elements being spaced apart from one another in the circumferential direction by a magnet pocket. The flux-guiding elements may be connected in a form-fit manner to the base body. This results in a type of segmented rotor design, which also has significant advantages with regard to manufacturing costs. It is conceivable, for example, for the cylindrical base body to be made of the first, low-permeable material as a solid body, and for the flux-guiding elements to be made of high-permeable magnetic steel sheets that are punch-packed on top of one another in the axial direction. Due to the flux-guiding elements having a partially ring-shaped cross section, sheet metal waste may be reduced compared to completely circular or completely ring-shaped elements.

A dynamoelectric machine according to one of the specific embodiments described above is very well suited for use in at least partially electrically driven vehicles, such as battery-operated electric vehicles or hybrid vehicles.

BRIEF DESCRIPTION OF THE DRAWING

The present invention is described in greater detail below with reference to the specific embodiments illustrated in the figures.

Elements having an identical function are associated with the same reference numerals in all the figures.

DETAILED DESCRIPTION

Figure 1:
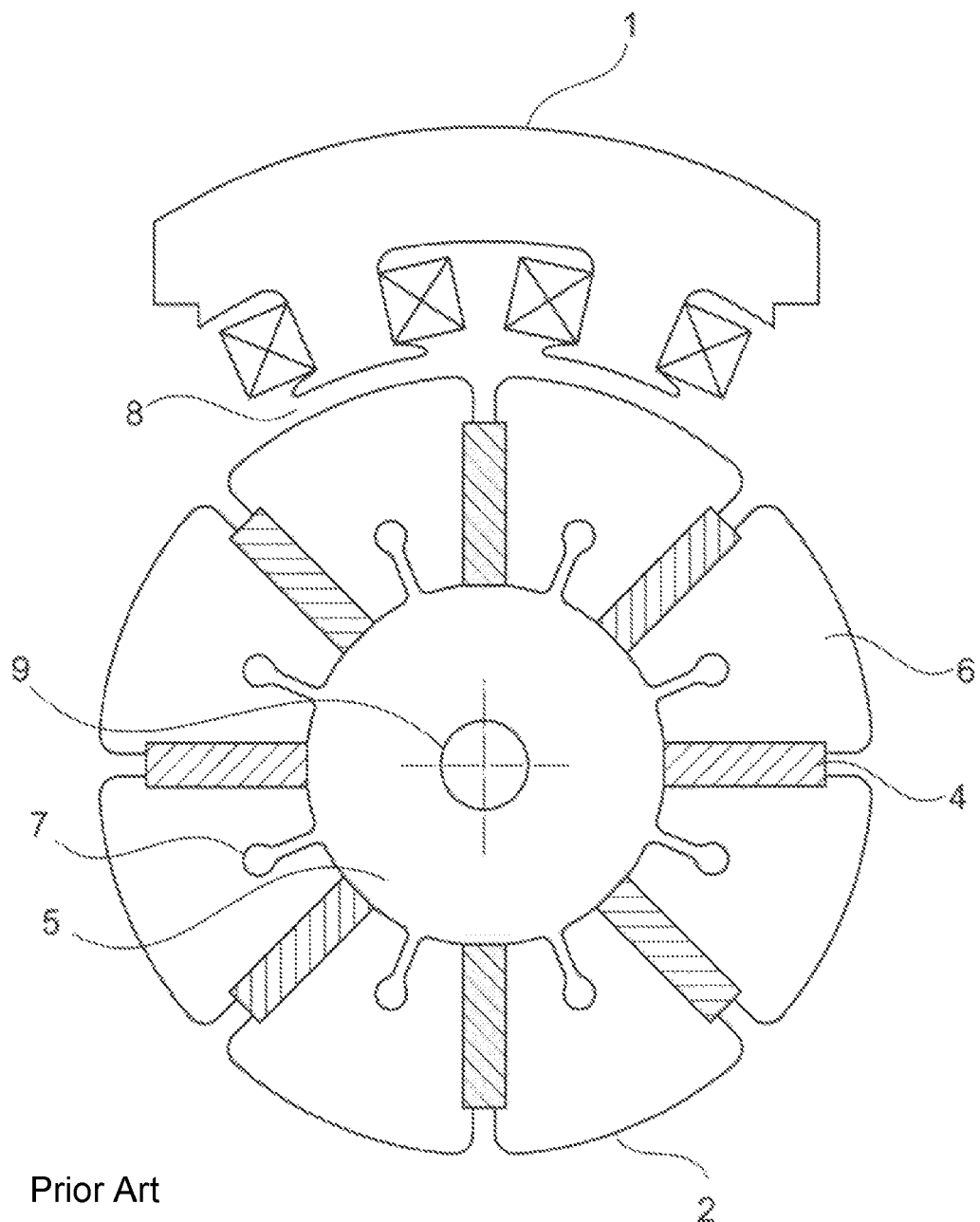
FIG. 1 shows a design of a permanently excited dynamoelectric machine known from the prior art.

FIG. 1 shows a design of a permanently excited dynamoelectric machine known from the prior art. Only a partially ring-shaped detail of a stator 1 designed according to toothed-coil technology is illustrated. Stator 1 concentrically surrounds a rotor 2 which is designed as an internal rotor and which is connected to a rotor shaft 9 in a rotatably fixed manner. Stator 1 and rotor 2 are spaced apart from one another in the radial direction via an air gap 8. In order to generate the excitation field which permeates radially through air gap 8, rotor 2 includes permanent magnets 4 which are buried in magnet pockets. These permanent magnets 4 are magnetized in the circumferential direction of rotor 2, and thus orthogonally with respect to the radial direction and axial direction of the rotor. Each permanent magnet 4 is adjoined on both sides in the circumferential direction by two flux-guiding elements 6 made of high-permeable material, for example punch-packed magnetic steel sheets. Within these flux-guiding elements 6, the magnetic flux, which initially emanates from permanent magnets 4 in the circumferential direction, is deflected in a radial direction, so that the magnetic flux lines pass essentially radially through air gap 8. In addition to permanent magnets 4, rotor 2 is made up of two essential further elements: a base body 5 which establishes the rotatably fixed connection to rotor shaft 9 and is situated in the radially inner area of rotor 2, and flux-guiding elements 6 which are connected in a form-fit manner to this base body 5. During assembly, flux-guiding elements 6 may be pushed axially onto corresponding form-fit elements 7 of base body 5. The circumferential extension of flux-guiding elements 6 is selected in such a way that magnet pockets for accommodating permanent magnets 4 remain in the spaces between the flux-guiding elements.

To be able to operate such a permanently excited dynamoelectric machine in the field weakening range, a suitable current component must be incorporated into the stator current of the machine which counteracts the excitation field generated by permanent magnets 4. However, this type of electrical field weakening, which may be achieved, for example, with the aid of the known field-oriented control, is associated with increased losses within the machine, and thus, an accompanying reduction in its efficiency.

The two figures described below show by way of example how the dynamoelectric machine illustrated in FIG. 1 may be modified, based on the present invention, to allow a field weakening operation with high electrical efficiency.

Figure 2:
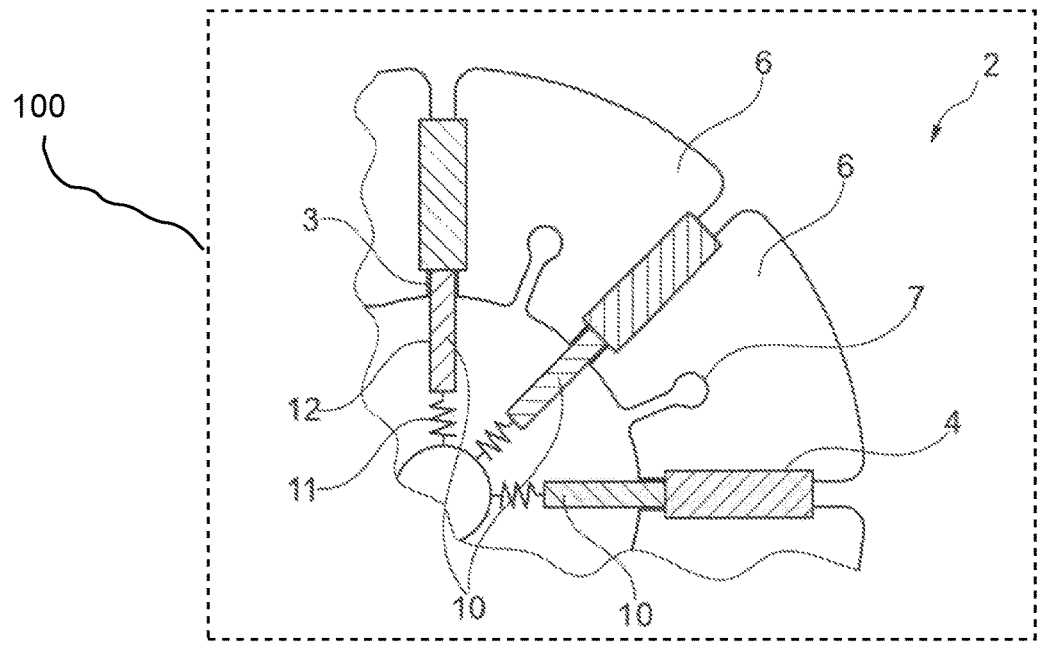
FIG. 2 shows one specific embodiment of a rotor according to the present invention in a first operating state.

FIG. 2 shows one specific embodiment of a rotor 2 according to the present invention in a first operating state. For reasons of clarity, an illustration of stator 1 has been dispensed with, since the present invention is represented only with respect to the design of rotor 2, with an electric vehicle 100 having the machine being shown schematically. Thus, a stator wound with toothed coils, as illustrated in FIG. 1, is conceivable here as well.

In the illustrated operating state, the machine is operated at a rotational speed that is less than or equal to the nominal rotational speed of the machine. The maximum possible excitation flow is provided in such an operating state. Rotor 2 illustrated in FIG. 2 also includes an essentially cylindrical base body 5, which in the radial direction is adjoined by high-permeable flux-guiding elements 6 which are adjacent to one another in the circumferential direction. Form-fit elements 7 are also provided here for connecting flux-guiding elements 6 to base body 5. Essentially cylindrical base body 5 is made of a first material whose permeability is much lower than the permeability of a second material of which flux-guiding elements 6 are made. Ideally, the first material of base body 5 is virtually magnetically insulating.

Grooves 12 in which leakage flux-guiding elements are radially guided are incorporated into base body 5. In the radial direction, grooves 12 are in flush alignment with magnet pockets 3 which separate flux-guiding elements 6 from one another in the circumferential direction and which accommodate permanent magnets 4 for generating the excitation flux. A radially directed displacement of leakage flux-guiding elements 10 is made possible by this aligned arrangement of grooves 12 and magnet pockets 3. Leakage flux-guiding elements 10 may thus be directed radially outwardly, i.e., displaced out of groove 12 into magnet pocket 3, in the direction of air gap 8. In the position illustrated in FIG. 2, leakage flux-guiding elements 10 are situated at the radially inwardly situated base of grooves 12. In the illustrated operating state, this position is forced by a schematically illustrated spring 11 which radially pretensions leakage flux-guiding elements 12 against the base of the groove.

In this illustrated position, leakage flux-guiding elements 10 are surrounded by the low-permeable material of base body 5 in the circumferential direction. In this position, leakage flux-guiding elements 10 have virtually no influence on the effective magnetic flux in air gap 8 of the machine.

Figure 3:
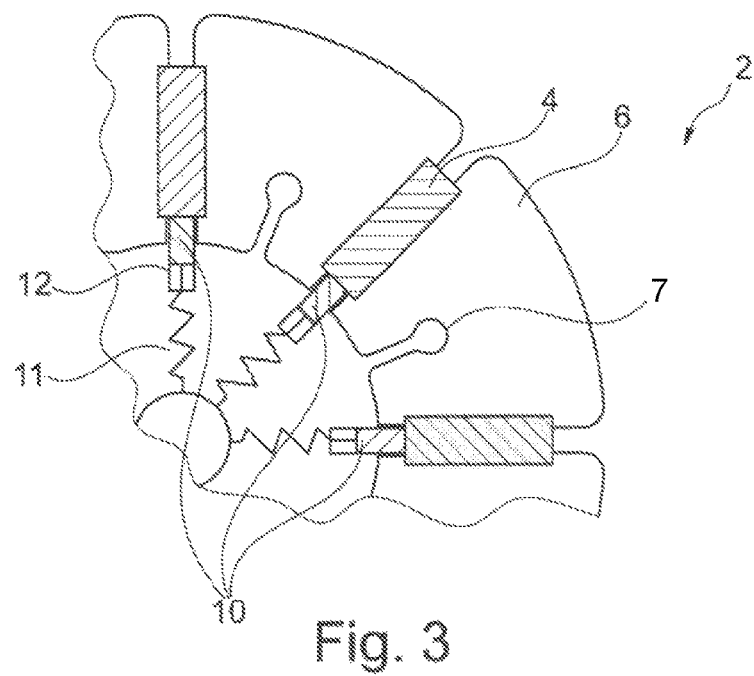
FIG. 3 shows one specific embodiment of a rotor according to FIG. 2 in a second operating state.

In contrast, FIG. 3 shows one specific embodiment of rotor 2 according to FIG. 2 in a second operating state. In this operating state, rotor 2 has a much higher rotational speed than the nominal rotational speed. The accompanying centrifugal force has pushed leakage flux-guiding elements 10 out of grooves 12 into magnet pockets 3 in the radial direction, against the pretensioning force of springs 11. High-permeable leakage flux-guiding elements 10 are now situated in the vicinity of likewise high-permeable flux-guiding elements 6 in the circumferential direction. As a result, a majority of the magnetic flux generated by permanent magnets 4 is now closed via leakage flux-guiding elements 10. This flux portion is thus no longer available for generating an excitation flux in air gap 8 of the machine. The machine is therefore operated in the field weakening operation.

LIST OF REFERENCE NUMERALS

1 stator
2 rotor
3 magnet pockets
4 permanent magnets
5 base body
6 flux-guiding elements
7 form-fit elements
8 air gap
9 rotor shaft
10 leakage flux-guiding elements
11 spring
12 grooves

What is claimed is:

1. A dynamoelectric permanently excited machine comprising:
   a stator;
   a rotor spaced apart from the stator via an air gap;
   permanent magnets situated in magnet pockets on the rotor for generating an excitation field in the air gap; and
   displaceable leakage flux-guiding elements guided in radially extending grooves formed in a first material having a first permeability, the leakage flux-guiding elements being displaceable at least partially into a second material having a second permeability which is greater than the first permeability such that a density of the excitation field in the air gap is influenceable via the radial position of the leakage flux-guiding elements;
   the leakage flux-guiding elements being situated radially beneath the permanent magnets.

2. The dynamoelectric permanently excited machine as recited in claim 1 wherein the permanent magnets are magnetized tangentially with respect to a circumferential direction of the rotor.

3. The dynamoelectric permanently excited machine as recited in claim 1 wherein the rotor is designed in such a way that a radially outwardly directed displacement of the leakage flux-guiding elements effectuates a reduction in the density of the excitation field.

4. The dynamoelectric permanently excited machine as recited in claim 3 wherein the rotor is designed in such a way that the radial outwardly directed displacement of the leakage flux-guiding elements is effectuated by a centrifugal force increasing with increasing rotor rotational speed.

5. The dynamoelectric permanently excited machine as recited in claim 4 wherein the leakage flux-guiding elements are inwardly pretensioned in the radial direction by a spring.

6. The dynamoelectric permanently excited machine as recited in claim 4 further comprising a signal input for an error signal, and an actuator for actively displacing the leakage flux-guiding elements radially outwardly.

7. The dynamoelectric machine as recited in claim 3 wherein the magnet pockets are situated in the second material having the second permeability which is greater than the first permeability, the grooves being situated in radial alignment with the magnet pockets, so that the leakage flux-guiding elements are each at least partially displaceable from a respective one of the grooves into a respective one of the magnet pockets.

8. The dynamoelectric permanently excited machine as recited in claim 7 wherein the rotor includes a central cylindrical base body made of the first material and multiple flux-guiding elements made of the second material, having a partially ring-shaped cross section, and situated on a lateral surface of the base body to form a complete ring, in each case two of the flux-guiding elements being spaced apart from one another in the circumferential direction by one of the magnet pockets.

9. The dynamoelectric permanently excited machine as recited in claim 8 wherein the flux-guiding elements are connected in a form-fit manner to the base body.

10. An at least partially electrically driven vehicle comprising the dynamoelectric permanently excited machine as recited in claim 1.

11. A dynamoelectric permanently excited machine comprising:
    a stator;
    a rotor spaced apart from the stator via an air gap;
    permanent magnets situated in magnet pockets on the rotor for generating an excitation field in the air gap;
    displaceable leakage flux-guiding elements guided in radially extending grooves, a density of the excitation field in the air gap being influenceable via the radial position of the leakage flux-guiding elements,
    the leakage flux-guiding elements being situated radially beneath the permanent magnets,
    wherein the rotor is designed in such a way that a radially outwardly directed displacement of the leakage flux-guiding elements effectuates a reduction in the density of the excitation field;
    a signal input for an error signal; and
    an actuator for actively displacing the leakage flux-guiding elements radially outwardly.

12. A dynamoelectric permanently excited machine comprising:
    a stator;
    a rotor spaced apart from the stator via an air gap;

permanent magnets situated in magnet pockets on the rotor for generating an excitation field in the air gap;

displaceable leakage flux-guiding elements guided in radially extending grooves, a density of the excitation field in the air gap being influenceable via the radial position of the leakage flux-guiding elements, the leakage flux-guiding elements being situated radially beneath the permanent magnets, wherein the rotor is designed in such a way that a radially outwardly directed displacement of the leakage flux-guiding elements effectuates a reduction in the density of the excitation field, wherein the grooves are situated in a first material having a first permeability, the magnet pockets are situated in a second material having a second permeability which is greater than the first permeability, the grooves being situated in radial alignment with the magnet pockets, so that the leakage flux-guiding elements are each at least partially displaceable from a respective one of the grooves into a respective one of the magnet pockets.

13. The dynamoelectric permanently excited machine as recited in claim 12 wherein the rotor includes a central cylindrical base body made of the first material and multiple flux-guiding elements made of the second material, having a partially ring-shaped cross section, and situated on a lateral surface of the base body to form a complete ring, in each case two flux-guiding elements being spaced apart from one another in the circumferential direction by a magnet pocket.

14. The dynamoelectric permanently excited machine as recited in claim 13 wherein the flux-guiding elements are connected in a form-fit manner to the base body.

\* \* \* \* \*